United States Patent
Graif et al.

(10) Patent No.: US 11,354,266 B2
(45) Date of Patent: Jun. 7, 2022

(54) HANG CORRECTION IN A POWER MANAGEMENT INTERFACE BUS

(71) Applicant: QUALCOMM Incorporated, San Diego, CA (US)

(72) Inventors: Sharon Graif, Zichron Yaakov (IL); Kishalay Haldar, Bangalore (IN); Navdeep Mer, Bangalore (IN); Viney Kumar, Bangalore (IN); Sriharsha Chakka, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/997,542

(22) Filed: Aug. 19, 2020

(65) Prior Publication Data

US 2022/0058154 A1 Feb. 24, 2022

(51) Int. Cl.
*G06F 13/42* (2006.01)
*G06F 13/40* (2006.01)
*G06F 13/374* (2006.01)

(52) U.S. Cl.
CPC ........ *G06F 13/4291* (2013.01); *G06F 13/374* (2013.01); *G06F 13/409* (2013.01); *G06F 13/4031* (2013.01); *G06F 13/4068* (2013.01)

(58) Field of Classification Search
CPC ............... G06F 13/4291; G06F 13/374; G06F 13/4031; G06F 13/4068; G06F 13/409
See application file for complete search history.

(56) References Cited

U.S. PATENT DOCUMENTS

| 6,292,045 B1* | 9/2001 | Bongiorno | G06F 1/08 327/298 |
| 2004/0123005 A1* | 6/2004 | Stuber | G06F 13/37 710/107 |
| 2008/0244129 A1* | 10/2008 | Tsai | G06F 13/4291 710/107 |
| 2009/0085631 A1* | 4/2009 | Lambrecht | G06F 13/4291 327/299 |
| 2011/0208885 A1* | 8/2011 | Kwek | G06F 13/4072 710/107 |
| 2016/0147707 A1* | 5/2016 | Freudenberger | G06F 13/4022 710/110 |
| 2017/0199839 A1* | 7/2017 | Mishra | G06F 13/364 |
| 2017/0212850 A1* | 7/2017 | Mishra | H04L 12/403 |
| 2018/0018292 A1* | 1/2018 | Malipeddi | G06F 1/24 |
| 2019/0004991 A1* | 1/2019 | Foust | G06F 13/364 |
| 2019/0155781 A1* | 5/2019 | Amarilio | G06F 13/362 |

* cited by examiner

*Primary Examiner* — Phong H Dang
(74) *Attorney, Agent, or Firm* — Qualcomm Incorporated (57) ABSTRACT

The systems and methods for hang correction in a power management interface bus cause secondary master devices associated with the power management interface bus to utilize timers to determine if a master that won arbitration has asserted a clock signal within a predefined amount of time. If a timer for a secondary master device expires without a clock signal being asserted by the winning master, the secondary master will assume ownership of the bus and assert a clock signal. Priorities between secondary masters are created by using a master identification (MID) value assigned during bus enumeration to determine a timer value. By allowing the secondary masters to assume ownership after expiration of respective timers, bus ownership is maintained in the event that a winning master hangs and does not assert ownership.

23 Claims, 8 Drawing Sheets

HANG CORRECTION IN A POWER MANAGEMENT INTERFACE BUS

BACKGROUND

I. Field of the Disclosure

The technology of the disclosure relates generally to controlling a power management interface bus and, more particularly, to controlling a system power management interface (SPMI) bus.

II. Background

Computing devices abound in modern society. The proliferation of computing devices is at least in part attributable to the rise of mobile computing devices such as smart phones. Computing devices frequently rely on different specialized integrated circuits (ICs) that perform specific functions for the computing devices. When more than one IC is present, there must be an accepted protocol or standard through which the ICs may communicate with one another. Much as the ICs may be specialized in the tasks that they are capable of performing so too have specialized protocols been created. One such protocol is the system power management interface (SPMI) put forth by the MIDI Alliance.

SUMMARY OF THE DISCLOSURE

Aspects disclosed in the detailed description include systems and methods for hang correction in a power management interface bus. In particular, exemplary aspects of the present disclosure cause secondary master devices associated with the power management interface bus to utilize timers to determine if a master that won arbitration has asserted a clock signal within a predefined amount of time. If a timer for a secondary master device expires without a clock signal being asserted by the winning master, the secondary master will assume ownership of the bus and assert a clock signal. Priorities between secondary masters are created by using a master identification (MID) value assigned during bus enumeration to determine a timer value. By allowing the secondary masters to assume ownership after expiration of respective timers, bus ownership is maintained in the event that a winning master hangs and does not assert ownership. This helps prevent restarting the bus, which may reduce performance or, at a minimum, introduce latency.

In this regard in one aspect, an integrated circuit (IC) is disclosed. The IC includes a bus interface coupled to a two-wire power management interface bus. The IC also includes a clock source coupled to the bus interface. The IC also includes a timer. The IC also includes a control circuit coupled to the bus interface and the timer. The control circuit is configured to, responsive to detecting an arbitration request through the bus interface, start the timer. The control circuit is also configured to, responsive to the timer expiring without detecting a clock signal through the bus interface, assume ownership of the two-wire power management interface bus. The control circuit is also configured to, after assuming the ownership of the two-wire power management interface bus, provide a clock signal from the clock source through the bus interface.

In another aspect, an IC is disclosed. The IC includes a bus interface coupled to a two-wire power management interface bus. The IC also includes a clock source coupled to the bus interface. The IC also includes a timer. The IC also includes a control circuit coupled to the bus interface and the timer. The control circuit is configured to, responsive to detecting an arbitration request through the bus interface, start the timer. The control circuit is also configured to, responsive to the timer expiring without detecting a clock signal through the bus interface, conclude a hang condition. The control circuit is also configured to, responsive to concluding the hang condition, leave the two-wire power management interface bus.

In another aspect, a power management system is disclosed. The power management system includes a two-wire power management interface bus. The power management system also includes a first master including a first IC. The first IC includes a first bus interface coupled to the two-wire power management interface bus. The first IC also includes a first clock source coupled to the first bus interface. The first IC also includes a first timer. The first IC also includes a first control circuit coupled to the first bus interface and the first timer. The first control circuit is configured to assume bus ownership of the two-wire power management interface bus. The first control circuit is also configured to, responsive to detecting an arbitration request through the first bus interface, start the first timer. The first control circuit is also configured to, responsive to the first timer expiring without detecting a clock signal through the first bus interface, conclude a hang condition. The first control circuit is also configured to, responsive to concluding the hang condition, leave the two-wire power management interface bus. The power management system also includes a second master including a second IC. The second IC includes a second bus interface coupled to the two-wire power management interface bus. The second IC also includes a second clock source coupled to the second bus interface. The second IC also includes a second timer. The second. IC also includes a second control circuit coupled to the second bus interface and the second timer. The second control circuit is configured to, responsive to detecting the arbitration request through the second bus interface, start the second timer. The second control circuit is also configured to, responsive to the second timer expiring without detecting a clock signal from the first master, assume ownership of the two-wire power management interface bus. The second control circuit is also configured to, after assuming the ownership of the two-wire power management interface bus, provide a clock signal from the second clock source through the second bus interface.

In another aspect, a method for controlling a power management interface bus. The method includes detecting, at a master that does not own the power management interface bus, an arbitration request. The method also includes, responsive to detecting the arbitration request, starting a timer. The method also includes, responsive to the timer expiring without detecting a clock signal on the power management interface bus, assuming ownership of the power management interface bus.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for hang correction in a power management interface bus. In particular, exemplary aspects of the present disclosure cause secondary master devices associated with the power management interface bus to utilize timers to determine if a master that won arbitration has asserted a clock signal within a predefined amount of time. If a timer for a secondary master device expires without a clock signal being asserted by the winning master, the secondary master will assume ownership of the bus and assert a clock signal. Priorities between secondary masters are created by using a master identification (MID) value assigned during bus enumeration to determine a timer value. By allowing the secondary masters to assume ownership after expiration of respective timers, bus ownership is maintained in the event that a winning master hangs and does not assert ownership. This helps prevent restarting the bus, which may reduce performance or, at a minimum, introduce latency.

Figure 1:
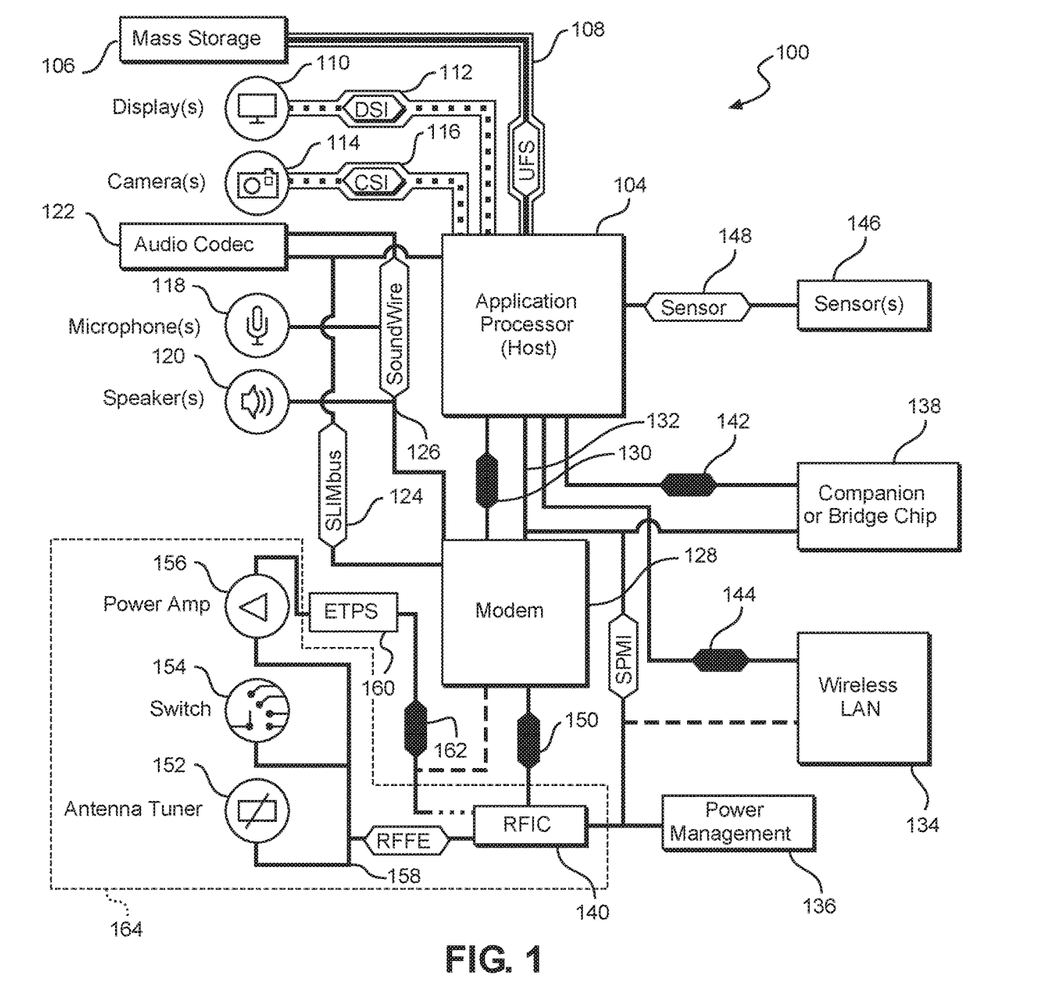
FIG. 1 is a block diagram of an exemplary computing device with associated buses therein including a system power management interface (SPMI) bus.

In this regard, FIG. 1 is a system-level block diagram of an exemplary mobile terminal 100 such as a smart phone, mobile computing device tablet, or the like. With continued reference to FIG. 1, the mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUNDWIRE bus 126. The modem 128 may further be connected to the application processor 104 through a peripheral component interconnect (PCI) or PCI express (PCIe) bus 130 and/or a system power management interface (SPMI) bus 132. The SPMI bus 132 may be a two wire bus including a clock line and a data line (not illustrated in FIG. 1). At its simplest, SPMI is a protocol to communicate between a host and a power management integrated circuit (e.g., PMIC 136 described below) to control voltage regulators from the host and communicate voltage increases and decreases back from the PMIC 136.

With continued reference to FIG. 1, the SPMI bus 132 may also be coupled to a local area network (LAN or WLAN) IC (LAN IC or WLAN IC) 134, a power management integrated circuit (PMIC) 136, a companion IC (sometimes referred to as a bridge chip) 138, and a radio frequency IC (RFIC) 140. In exemplary aspects, one or more of these ICs may be masters or slaves. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the MC 140 may couple to one or more RFFE elements, such as an antenna tuner 152, a switch 154, and a power amplifier 156 through a radio frequency front end (RFFE) bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated).

Figure 2:
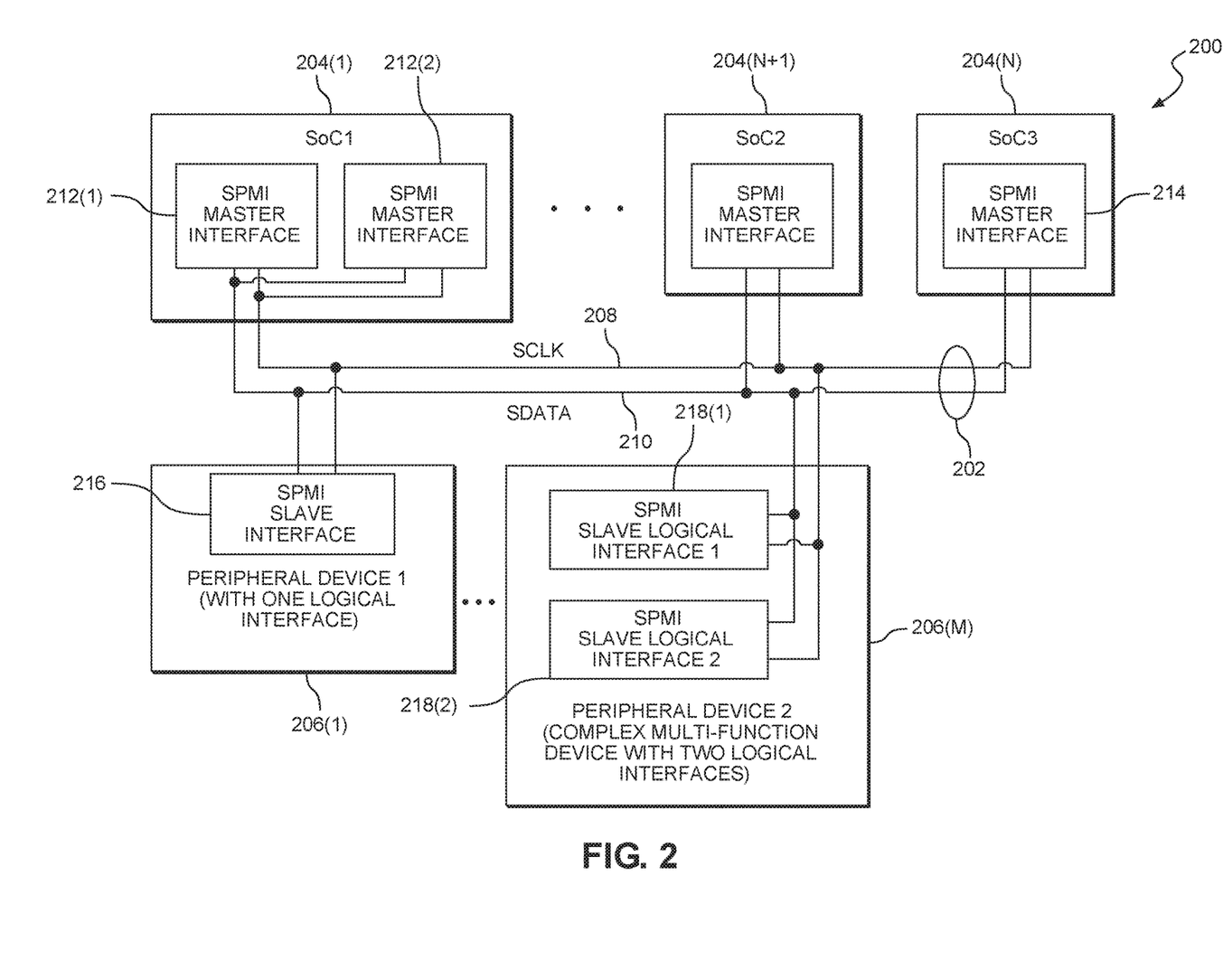
FIG. 2 is a block diagram of an SPMI subsystem having multiple masters and multiple slaves attached to an SPMI bus.

FIG. 2 is a block diagram of an SPMI subsystem 200 (also generically referred to as a power management system) having multiple masters and multiple slaves attached to a two-wire SPMI bus 202 (sometimes just referred to as a two-wire bus or a two-wire power management interface bus), which may be the SPMI bus 132 of FIG. 1. In this regard, the SPMI subsystem 200 includes a plurality of masters 204(1)-204(N) and a plurality of slaves 206(1)-206(M). As illustrated, N=3 and M=2, but it should be appreciated that the SPMI standard allows up to four masters 204 and up to sixteen slaves 206. The SPMI bus 202 may include a clock line 208 and a data line 210 (also referred as SCLK and SDATA, respectively, in FIG. 2). A given master 204(1) may have multiple this case two) SPMI interfaces 212(1)-212(2) coupled to the SPMI bus 202. More commonly, a master such as master 204(N) may have a single SPMI interface 214 coupled to the SPMI bus 202. Similarly, a slave such as slave 206(1) may have a single SPMI interface 216 and a slave such as slave 206(M) may have multiple (in this case two) SPMI interfaces 218(1)-218(2).

Figure 3:
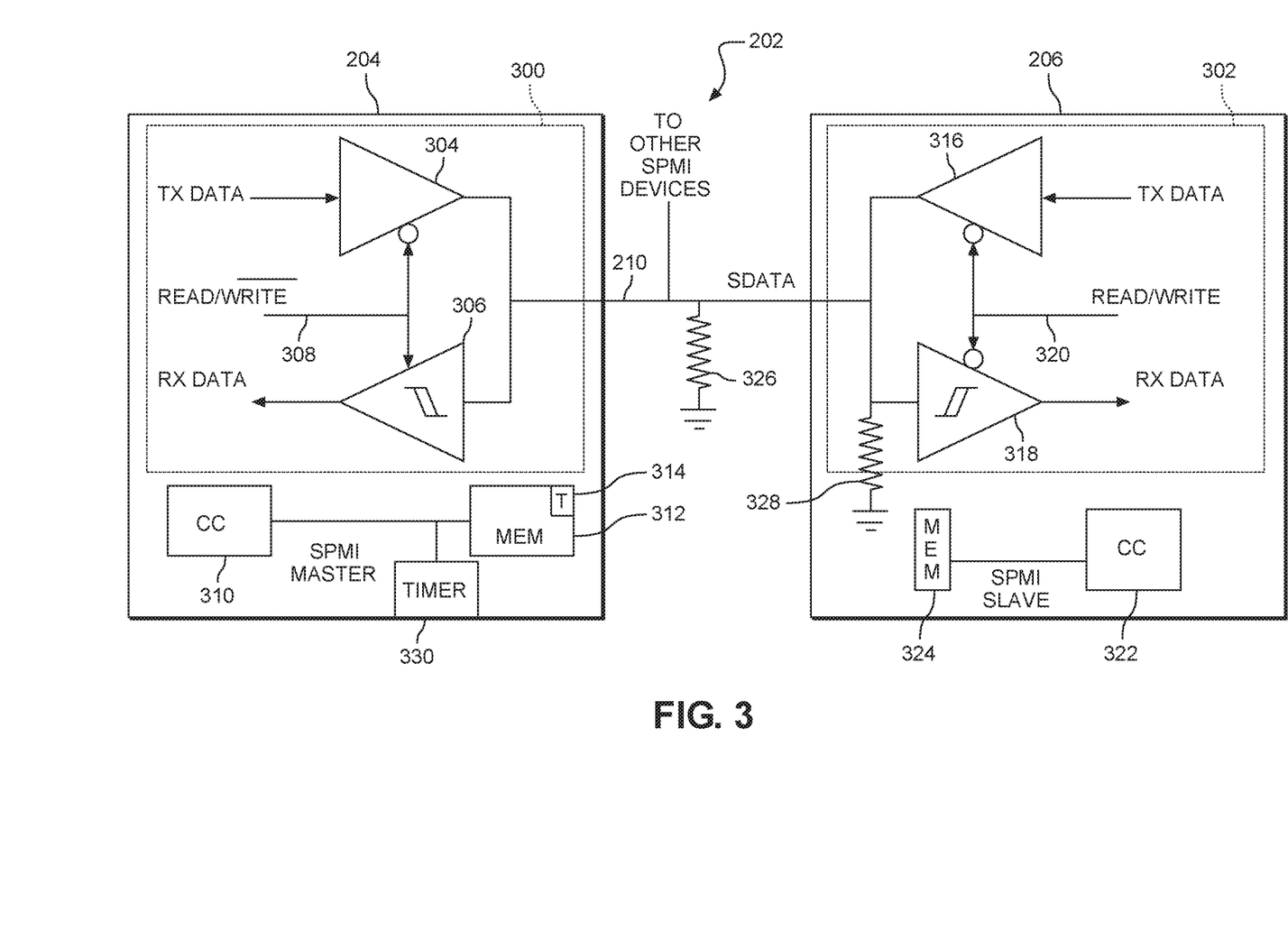
FIG. 3 is a schematic diagram of input/output requirements for a data line of an SPMI bus for a master and a slave.

FIG. 3 is a schematic diagram of input/output requirements for the data line 210 of the SPMI bus 202 for a master 204 and a slave 206. In particular, a bus interface 300 for the master 204 is illustrated along with a bus interface 302 for the slave 206. The bus interface 300 includes a data out amplifier 304 that sends data on the data line 210 and a data in amplifier 306 that amplifies incoming signals received on the data line 210. The data out/in amplifiers 304, 306 are toggled by a read/write or data in enable signal 308. The master 204 may further include a control circuit 310 (sometimes referred to as CC in the drawings) and a memory element 312 (sometimes referred to as MEM in the drawings) in which a configuration table 314 (sometimes referred to as T in the drawings) is stored.

The bus interface 302 includes a data out amplifier 316 that sends data on the data line 210 and a data in amplifier 318 that amplifies incoming signals received on the data line 210. The data out/in amplifiers 316, 318 are toggled by a read/write or data in enable signal 320. The slave 206 may further include a control circuit 322 (sometimes referred to as CC in the drawings) and a memory element 324 (sometimes referred to as MEM in the drawings). Additional pull-down resistors 326 and 328 may be associated with the data line 210 to help provide a logical low when desired. Note that both, one, or neither of the pull-down resistors 326, 328 may be present.

Additionally, the master 204 may include a timer 330 that may be used to determine if another master has assumed ownership of the SPMI bus 202 as better explained below.

Figure 4:
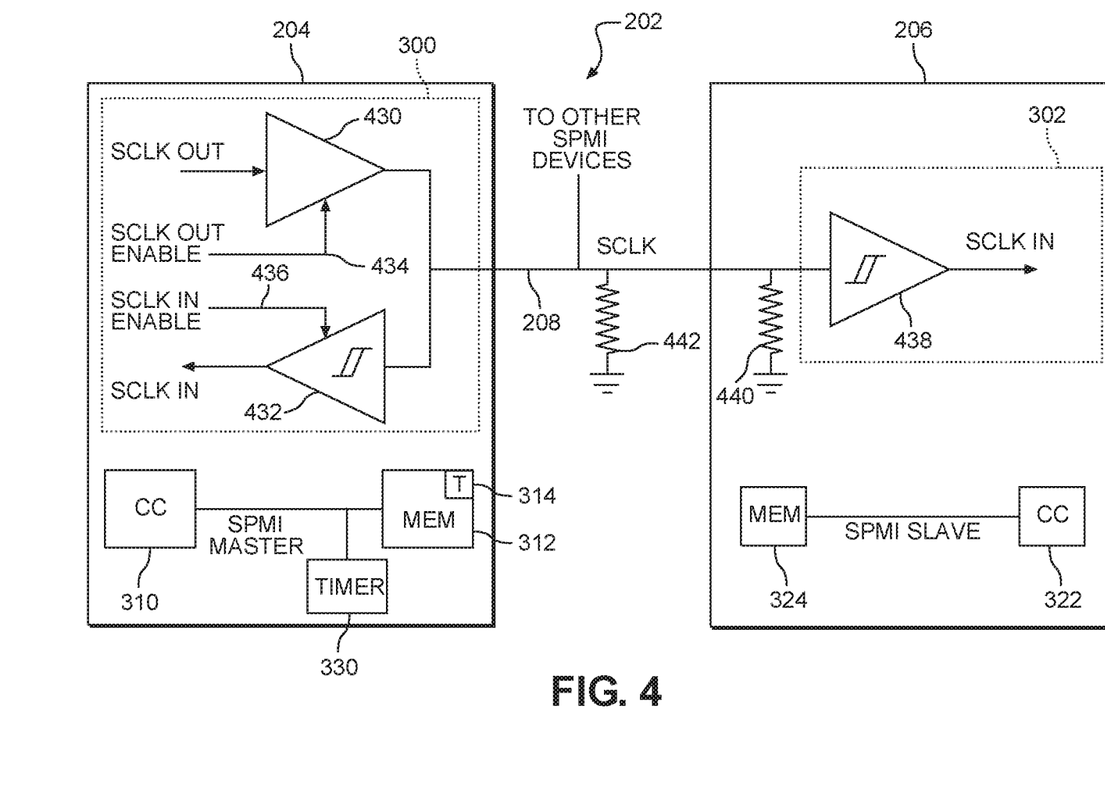
FIG. 4 is a schematic diagram of input/output requirements for a clock line of an SPMI bus for a master and a slave.

Similarly, FIG. 4 is a schematic diagram of input/output requirements for the clock line 208 of the SPMI bus 202 for the master 204 and the slave 206. In particular, the bus interface 300 for the master 204 is illustrated along with the bus interface 302 for the slave 206. The bus interface 300 includes a clock out amplifier 430 that sends a clock signal from a clock source (not shown) on the clock line 208 and a clock in amplifier 432 that amplifies incoming signals received on the clock line 208 (including any reflections). The clock out amplifier 430 is enabled by an SCLK OUT ENABLE signal 434, while the clock in amplifier 432 is enabled by an SCLK IN ENABLE signal 436.

The bus interface 302 includes a clock in amplifier 438 that amplifies incoming signals received on the clock line 208. Additional pull-down resistors 440 and 442 may be associated with the clock line 208 to help provide a logical low when desired. Note that both, one, or neither of the pull-down resistors 440, 442 may be present.

The SPMI bus 202 may undergo a master arbitration phase to determine which master within the SPMI subsystem 200 is the bus owner master (BOM). The winning master will remain the BOM for an entire transaction after which time, another master may win arbitration to become the BOM. Each slave in the system relies on the BOM to provide the clock signal on the clock line 208.

Figure 5:
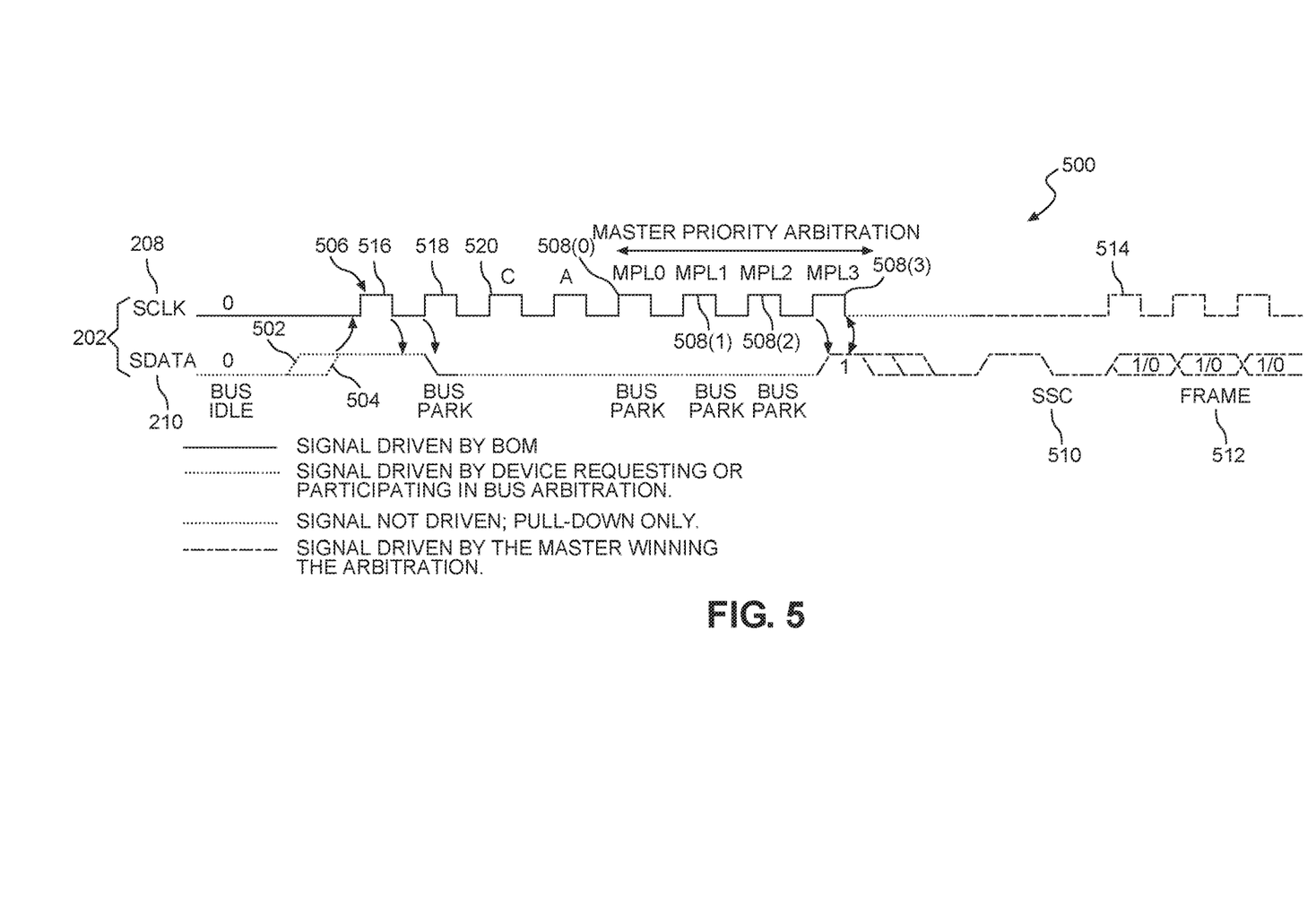
FIG. 5 is a signal diagram showing signals on clock and data lines of an SPMI bus during and after master arbitration.

FIG. 5 illustrates a waveform 500 associated with a master 204 winning arbitration to become the BOM per the SPMI standard. The waveform 500 begins with the SPMI bus 202 idle and the data line 210 being loosely held at a logical low meaning that other actors on the SPMI bus 202 may (hive the data line 210 to a logical high. As illustrated, a device may request arbitration or may participate in bus arbitration by driving the data line 210 to a logical high as seen at 502 and 504. Responsive to this arbitration request, the BOM may drive the clock line 208 with a clock signal 506 and additional signals 508(0)-508(3) being generated by masters having different master priority levels (MPLs) as part of the arbitration. Meanwhile, the data line 210 remains at a logical low until the arbitration is decided at which point the BOM begins driving the data line 210 with a sequence start condition (SSC) signal 510, followed by a frame 512 while driving the clock line 208 with a clock signal 514. More detail on this arbitration process can be found in the SPMI specification available to MIPI members at mipi.org.

Figure 6:
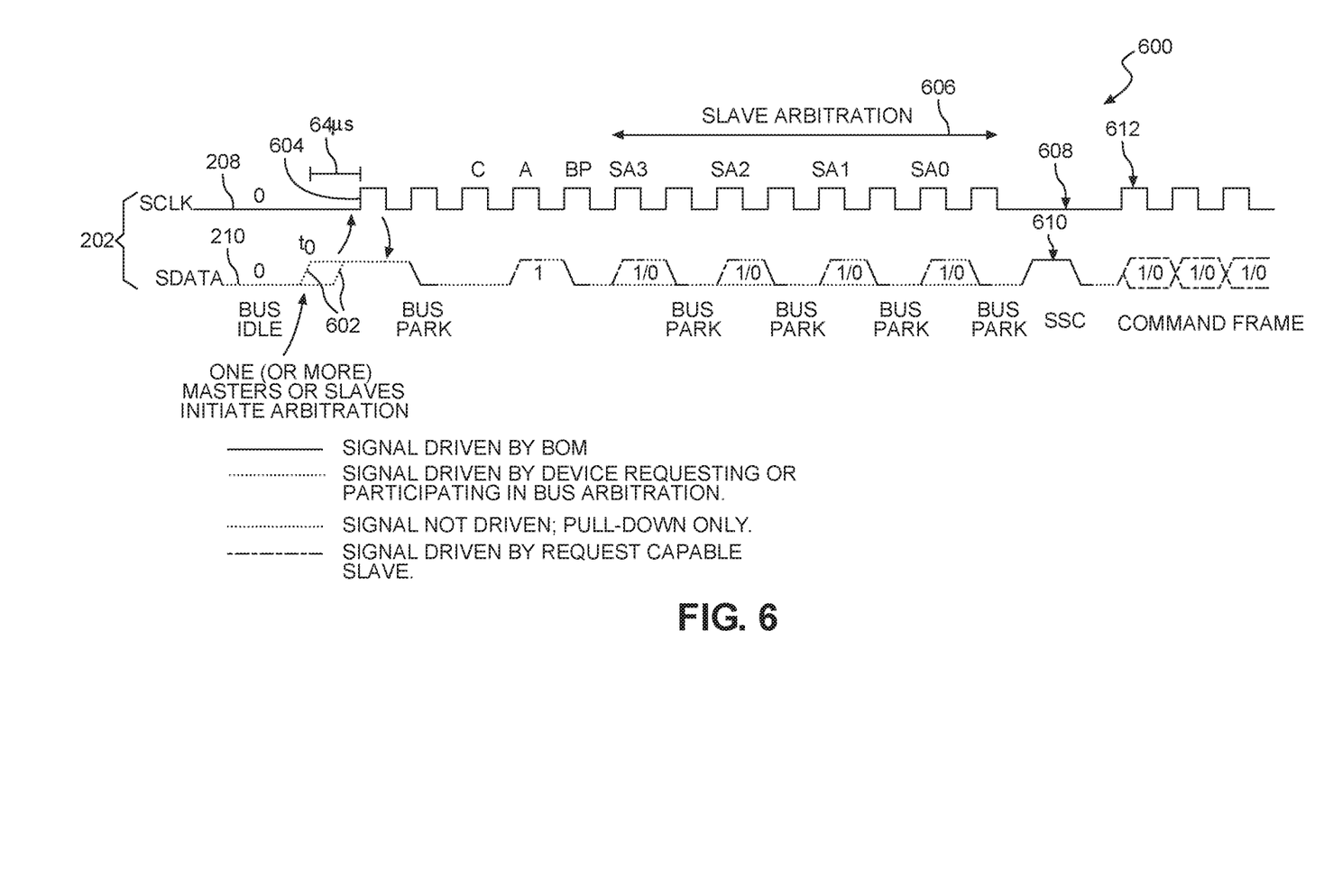
FIG. 6 is a signal diagram showing signals on clock and data lines of an SPMI bus during and after slave arbitration.

Similarly, there may be situations where the slaves 204 go through arbitration. In such a situation, the SPMI standard requires that the BOM provide a clock signal from the start of the arbitration until the end of the slave transaction and, more specifically, the BOM shall provide the clock signal within 64 microseconds (μs) of the assertion which triggers slave arbitration. Waveform 600 of FIG. 6 illustrates a conventional situation where the BOM does provide the desired clock signal within the time limit set forth in the SPMI standard. In this regard, the waveform 600 begins with both the clock line 208 and the data line 210 of the SPMI bus 202 being idle. At some time, one or more slaves 206(1)-206(M) initiate slave arbitration by raising the data line 210 to a logical high (shown at 602). From the time t0 when the data line 210 is initially driven high to the first rising edge 604 of the clock signal, no more than 64 μs will have elapsed in a working SPMI subsystem 200. The clock signal remains on through the slave arbitration 606, while the data line 210 is occasionally driven high and then parked. At the end of the slave arbitration 606, the master holds the clock line 208 low (shown at 608), and provides an SSC signal 610, then resumes a periodic clock signal 612.

As noted, the SPMI standard relies on the BOM providing a clock signal within a certain amount of time after the request for arbitration. However, there may be situations where the BOM does not (or sometimes even cannot) provide the needed clock signal. This may be referred to as an arbitration hang, as in the bus is "hung up" until the BOM can resolve whatever issue prevented the activation of the clock signal. In some cases, this may involve restarting the bus. In any event, such hangs may introduce delay in execution of power management related activities, which may negatively impact performance.

Exemplary aspects of the present disclosure provide a mechanism for other masters that are originally not considered to be the BOM (i.e., non-BOMs) to provide a dock signal and assume the mantle of BOM. In particular, responsive to an arbitration request (either from a master or a slave each non-BOM will start a timer. The time allocated by the respective timers is based on a MID value multiplied by a standard time value (e.g., 65 μs). Thus, the non-BOM with an MID value of one (1) has a timer of 65 μs (1×65), the non-BOM with an MID value of two (2) has a timer of 130 μs (2×65), and so on. If no clock signal has been provided on the clock line 208 before expiration of the respective timer, then that non-BOM will assert a clock signal and assume the role of the BOM. If a clock signal is detected before expiration of the timer, then some other master has asserted ownership of the bus and the timer ends. Meanwhile, the original BOM will release from the bus and try to reconnect, which, in many instances, will correct the source of the hang. Thus, for example, in an SPMI system with four masters, one of which is the BOM, and three of which are non-BOMs with MID values of one (1), two (2), and three (3), there may be an arbitration request. On receipt of the arbitration request, the three non-BOMs start respective timers of 65 μs, 130 μs, and 195 μs. If there is no clock signal after 65 μs, the non-BOM with the MID value of one (1) begins to use its clock signal. The other two non-BOMB turn off their timers on detection of the clock signal and SPMI phases occur. If, however, the non-BOM with the MID value of one (1) also hangs, then no clock signal is detected in the first 130 μs, and the non-BOM with the MID value of two (2) begins to use its clock signal. While 65 μs has been used, it should be appreciated that this value is configurable based on the needs of the system.

Figure 7:
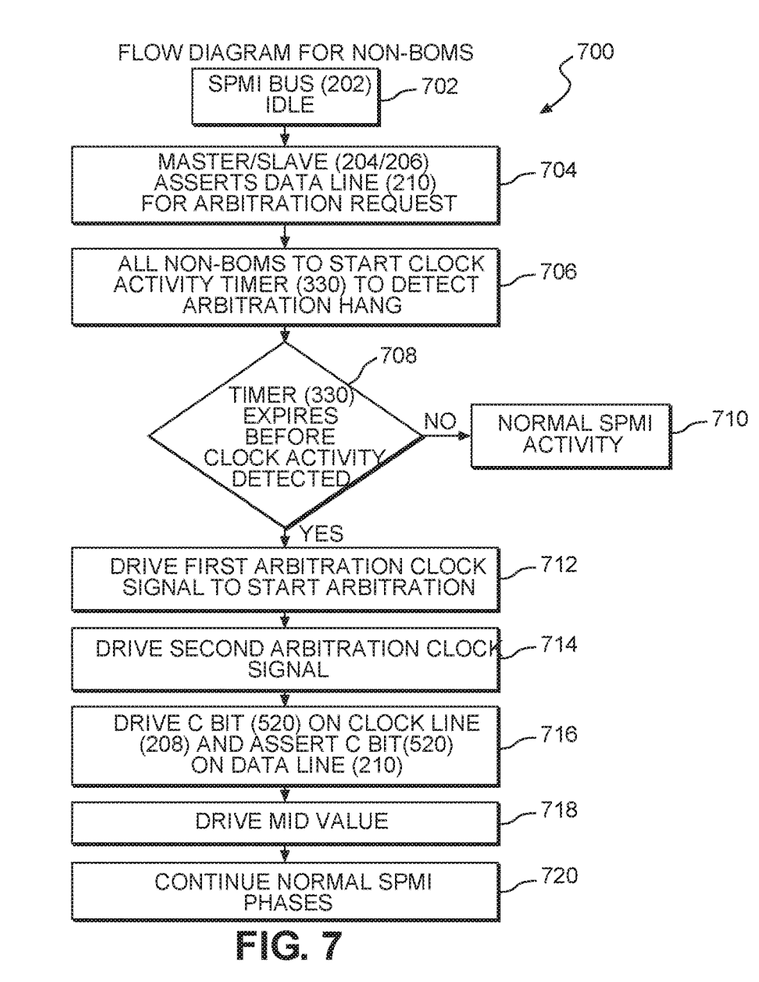
FIG. 7 is a flowchart illustrating an exemplary process for secondary masters to track bus hangs and assert bus ownership when a hang is detected.

An exemplary process 700 for the non-BOMs is provided with reference to FIG. 7. The process 700 begins with the SPMI bus 202 being idle (block 702) (e.g., see FIG. 5 or 6). A master 204 or a slave 206 asserts the data line 210 for an arbitration request (block 704, see also 504 or 602). In a change from the SPMI standard, responsive to the arbitration request of block 704, all non-BOMs start a clock activity timer 330 to detect an arbitration hang (block 706).

With continued reference to FIG. 7, the control circuit 310 of a non-BOM 204 then determines if the timer 330 has expired before clock activity is detected on the clock line 208 (block 708). That is, if a clock signal is detected on the clock line 208 before the timer 330 expires, then normal SPMI activity occurs (block 710) since a BOM has provided the needed clock signal. Note that this clock signal may be from the original BOM or a different, originally non-BOM that has taken over as better illustrated in FIG. 9.

However, if the timer 330 does expire before clock activity is detected, the master concludes that the BOM has hung, and the master 204 must assume BOM status. Thus, the master 204 drives the first arbitration clock signal (block 712) (e.g., the first hump 516 on the clock line 208 of FIG. 5) and drives the second arbitration clock signal (block 714) (e.g., the second hump 518 on the clock line 208 of FIG. 5). The master 204 then drives a C bit 520 on the clock line 208 and asserts the C bit 520 on the data line 210 (block 716) before driving the MID value (block 718) to show bus ownership, and then continuing normal SPMI phases (block 720).

Figure 8:
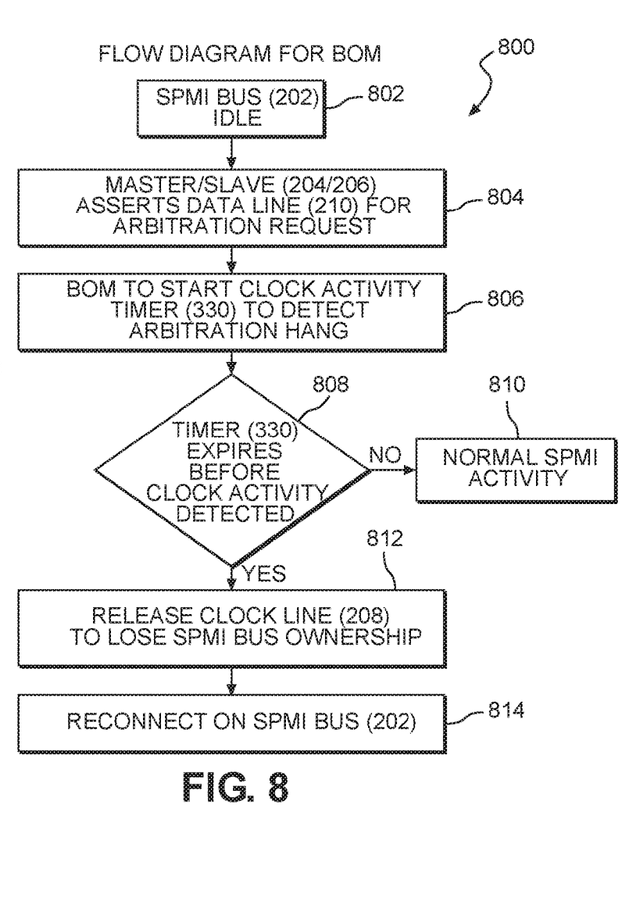
FIG. 8 is a flowchart illustrating an exemplary process for a winning master that has become hung to operate in conjunction with the bus.

In contrast, a process 800 for the original BOM 204 is illustrated in FIG. 8. The process 800 starts with the master 204 being the BOM from an earlier arbitration event and the SPMI bus 202 being idle (block 802). A master 204 or a slave 206 asserts the data line 210 for an arbitration request (block 804). The BOM 204 starts a clock activity timer 330 to detect an arbitration hang (block 806). The control circuit 310 of the BOM 204 then determines if the timer 330 has expired before clock activity is detected on the clock line 208 (block 808). That is, if a clock signal is detected on the clock line 208 before the timer 330 expires, then normal SPMI activity occurs (block 810) since the BOM has provided the needed clock signal. If, however, the timer 330 expires with no clock signal, the BOM 204 concludes it has an arbitration hang and releases the clock line 208 to lose BOM status (block 812) and then attempts to reconnect to the SPMI bus 202 (block 814).

Figure 9:
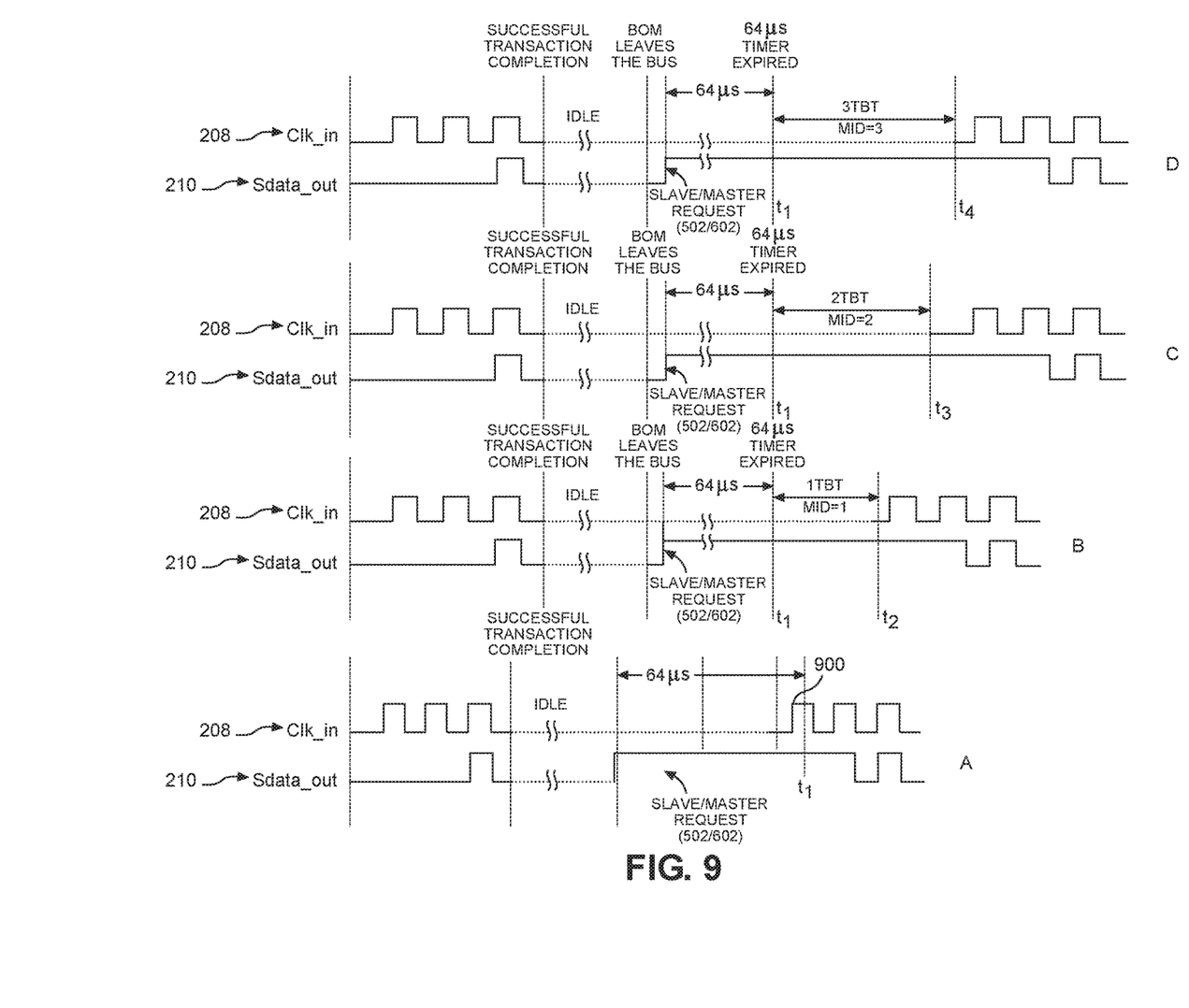
FIG. 9 is a signal diagram of various masters within an SPMI system illustrating how secondary masters may assert bus ownership in the event of a bus hang.

The activities of the timers 330 of the various masters 204 are better understood with reference to FIG. 9. FIG. 9 assumes that there are four masters, with MID values ranging from zero (0) to three (3). It is further assumed that the BOM has a MID value=0. If the BOM is active and there is no hang, then as shown in line A, the clock signal 900 begins within 64 µs of the arbitration request 502/602 where the 64 µs are shown as expiring at time t1. Thus, line A corresponds to a desired normal operation. However, if the BOM hangs, then exemplary aspects of the present disclosure allow one of the other non-BOMs to assume control. Thus, line B shows that if the BOM does not initiate a clock signal within 64 µs, the master with the MID value=1 causes its timer to run and begins its clock at time t2 after expiration of the timer. If the MID value=1 master also hangs, then as shown in line C, the master with the MID value=2 starts its clock at t3 after expiration of its timer. If the MID value=2 master also hangs, then as shown in line D, the master with the MID value=3 starts its clock at t4 after expiration of its timer.

The systems and methods for hang correction in a power management interface bus according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multi copter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC) comprising:
   a bus interface coupled to a two-wire power management interface bus;
   a clock source coupled to the bus interface;
   a timer; and
   a control circuit coupled to the bus interface and the timer, the control circuit configured to:
      participate in master arbitration to determine ownership of the two-wire power management interface bus;
      lose the master arbitration;
      after the master arbitration, and responsive to detecting an arbitration request through the bus interface, start the timer;
      responsive to the timer expiring without detecting a clock signal through the bus interface, assume the ownership of the two-wire power management interface bus; and
      after assuming the ownership of the two-wire power management interface bus, provide a clock signal from the clock source through the bus interface.

2. The IC of claim 1, wherein the bus interface comprises a system power management interface (SPMI) bus interface.

3. The IC of claim 1, wherein the control circuit is configured to set the timer based on a master identification (MID) value.

4. The IC of claim 3, wherein the control circuit is further configured to set the timer based on a multiple of the MID value.

5. The IC of claim 1, wherein the control circuit is configured to act as a bus owner master (BOM) after assuming the ownership of the two-wire power management interface bus.

6. An integrated circuit (IC) comprising:
   a bus interface coupled to a two-wire power management interface bus;
   a clock source coupled to the bus interface;
   a timer; and
   a control circuit coupled to the bus interface and the timer, the control circuit configured to:
      assume ownership of the two-wire power management interface bus;
      responsive to detecting an arbitration request through the bus interface, start the timer;
      responsive to the timer expiring without detecting a clock signal through the bus interface, conclude a hang condition;
      responsive to concluding the hang condition, leave the two-wire power management interface bus by releasing a clock line to lose the ownership; and
      rejoin the two-wire power management interface bus after leaving the two-wire power management interface bus.

7. The IC of claim 6, wherein the bus interface comprises a system power management interface (SPMI) bus interface.

8. The IC of claim 6, wherein the control circuit is further configured to provide a clock signal on the clock line through the bus interface before expiration of the timer.

9. The IC of claim 6, wherein the control circuit is further configured to participate in master arbitration.

10. The IC of claim 9, wherein the control circuit is further configured to assume bus ownership after winning the master arbitration.

11. The IC of claim 6, wherein the timer counts 64 microseconds (µs).

12. The IC of claim 6 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A power management system comprising:
   a two-wire power management interface bus;
   a first master comprising a first integrated circuit (IC) comprising:
      a first bus interface coupled to the two-wire power management interface bus;
      a first clock source coupled to the first bus interface;
      a first timer; and
      a first control circuit coupled to the first bus interface and the first timer, the first control circuit configured to:
         assume ownership of the two-wire power management interface bus;
         responsive to detecting an arbitration request through the first bus interface, start the first timer;
         responsive to the first timer expiring without detecting a clock signal through the first bus interface, conclude a hang condition; and
         responsive to concluding the hang condition, leave the two-wire power management interface bus; and
   a second master comprising a second IC comprising:
      a second bus interface coupled to the two-wire power management interface bus;
      a second clock source coupled to the second bus interface;
      a second timer; and
      a second control circuit coupled to the second bus interface and the second timer, the second control circuit configured to:
         responsive to detecting the arbitration request through the second bus interface, start the second timer;

responsive to the second timer expiring without detecting a clock signal from the first master, assume the ownership of the two-wire power management interface bus; and after assuming the ownership of the two-wire power management interface bus, provide a clock signal from the second clock source through the second bus interface.

14. The power management system of claim 13, wherein the two-wire power management interface bus comprises a system power management interface (SPMI) bus.

15. The power management system of claim 13, wherein the second master comprises a power management IC (PMIC).

16. The power management system of claim 13, wherein the first master comprises an application processor.

17. The power management system of claim 13, wherein the second timer is based on a master identification (MID) value of the second master.

18. The power management system of claim 13, further comprising at least one slave coupled to the two-wire power management interface bus.

19. The power management system of claim 18, wherein the at least one slave is configured to generate the arbitration request.

20. The power management system of claim 13 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

21. A method for controlling a power management interface bus, the method comprising:
    at a first master, participating in master arbitration to determine ownership of the power management interface bus;
    losing the master arbitration at the first master;
    detecting, at the first master after losing the master arbitration, an arbitration request;
    responsive to detecting the arbitration request, starting a timer; and
    responsive to the timer expiring without detecting a clock signal on the power management interface bus, assuming the ownership of the power management interface bus.

22. The method of claim 21, further comprising providing a clock signal to the power management interface bus as part of assuming the ownership of the power management interface bus.

23. The method of claim 21, further comprising basing the timer on a master identification (MID) value.

* * * * *